Sept. 25, 1928.

R. W. STROUT 1,685,439

NAIL MAKING MACHINE

Filed Jan. 19, 1926

INVENTOR
Robert W. Strout,
By Attorneys,
Fraser, Myers & Manley.

Sept. 25, 1928.

R. W. STROUT

NAIL MAKING MACHINE

Filed Jan. 19, 1926

INVENTOR :
Robert W. Strout,
By Attorneys,
Fraser, Myers & Manley

Sept. 25, 1928.       R. W. STROUT       1,685,439
NAIL MAKING MACHINE
Filed Jan. 19, 1926       5 Sheets-Sheet 3

INVENTOR:
Robert W. Strout,
By Attorneys,

Sept. 25, 1928.  R. W. STROUT  1,685,439
NAIL MAKING MACHINE
Filed Jan. 19, 1926   5 Sheets-Sheet 5

INVENTOR
Robert W. Strout,
By Attorneys,
Fraser, Myers & Manley

Patented Sept. 25, 1928.

1,685,439

UNITED STATES PATENT OFFICE.

ROBERT W. STROUT, OF BROOKLYN, NEW YORK, ASSIGNOR, BY MESNE ASSIGNMENTS, TO E. W. BLISS COMPANY, OF NEW YORK, N. Y., A CORPORATION OF DELAWARE.

NAIL-MAKING MACHINE.

Application filed January 19, 1926. Serial No. 82,264.

This invention relates to machines for making wire nails, and aims to provide a machine capable of operating at higher speed than has heretofore been attained.

The machine is of the class which automatically feeds wire from a coil or reel into a clamping die which grips the wire, leaving a sufficient length thereof protruding to form the head, which then is swaged down against the die by means of a reciprocating hammer, after which the die opens and the wire is fed forward a distance corresponding to the length of the nail to be made, and is then cut off and falls, or is knocked out, into a chute or hopper.

The nature of the improvements will become apparent as the description proceeds.

A machine constituting the preferred embodiment of the invention is shown in the accompanying drawings, wherein,—

Fig. 3 is a vertical longitudinal mid-section of the machine;

Fig. 3ª is a fragmentary view of the cam and roller (shown in dotted lines in Fig. 3) for operating the die;

Fig. 7 is a fragmentary elevation partly in vertical mid-section, corresponding to Fig. 3, showing the hammer and die at the instant of swaging the head.

Fig. 8 is a fragmentary view showing the wire from which the nail has been cut, and its relation to the ejector;

In the drawings, the wire is shown at $x$, and the nail made therefrom at $x'$.

The working parts of the machine are mounted on a frame 20 which is supported on a base 21; at one end of the frame is a bracket or extension 22.

The wire passes through straightening rollers 23 mounted on the extension 22, and is then engaged by the feeder 24 by which it is intermittently fed. This feeder comprises a pawl 25 which bites into the wire to feed it, and is mounted on a swinging arm or lever 26 pivoted at 27.

The wire enters an opening 28 in a part of the frame 20, and enters a coinciding opening in a fixed slide 29 which carries the wire-gripping die comprising jaws 30 and 31, the former being fixedly mounted on the slide and the latter being movable to grip the wire against the jaw 30 or release it. The protruding end of the wire left by the last previous cut is swaged to form the nail head by the action of a hammer or ram 40 carried in a chuck 41 on an adjustable head 42 which is mounted on a reciprocating slide 43.

Figures 2, 6:
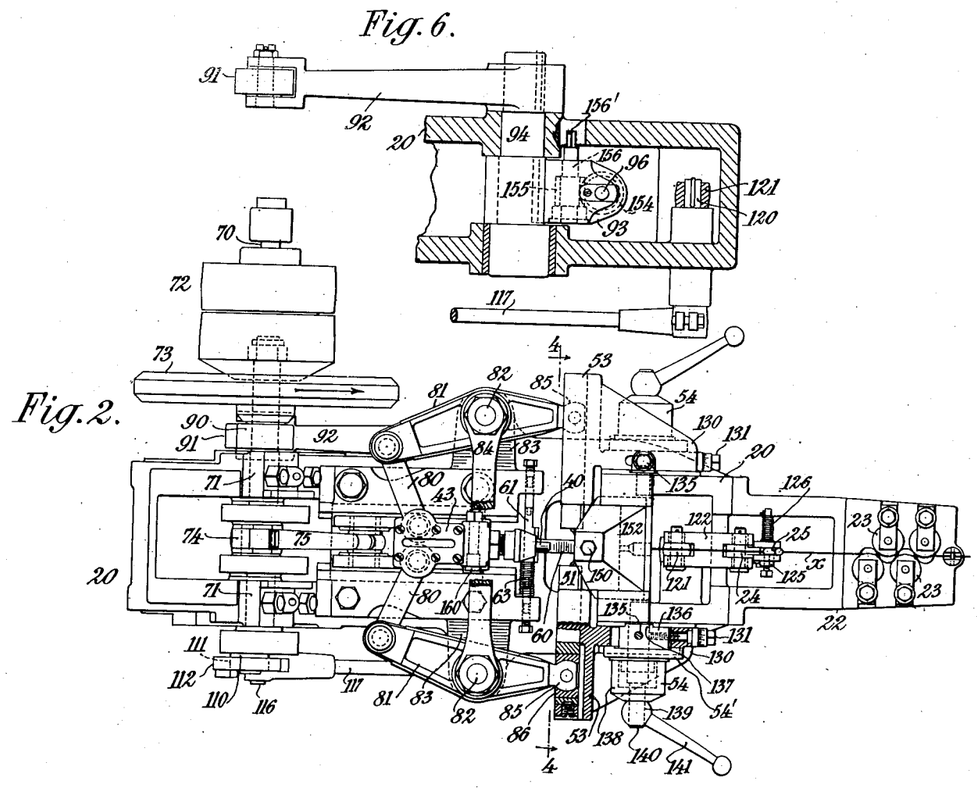
Fig. 2 is a plan of the machine partly in horizontal section.
Fig. 6 is a fragmentary plan partly in horizonal section, showing chiefly the lever which operates the die.

For cutting off the finished nail after the head has been formed, the hammer 40 has retreated and the wire has been fed forward an amount equal to the length of the nail, plus the wire swaged into the head, cutter dies 50, 50 (Fig. 5) are provided, mounted on horizontally-moving slides 51, 51, each of which slides in ways 52 in an adjustable frame 53. The two frames 53, 53 are mounted adjustably on opposite sides of the main frame 20, as shown in Fig. 2, and fastened in place by screw clamps 54.

Figures 3, 3A, 7, 8:
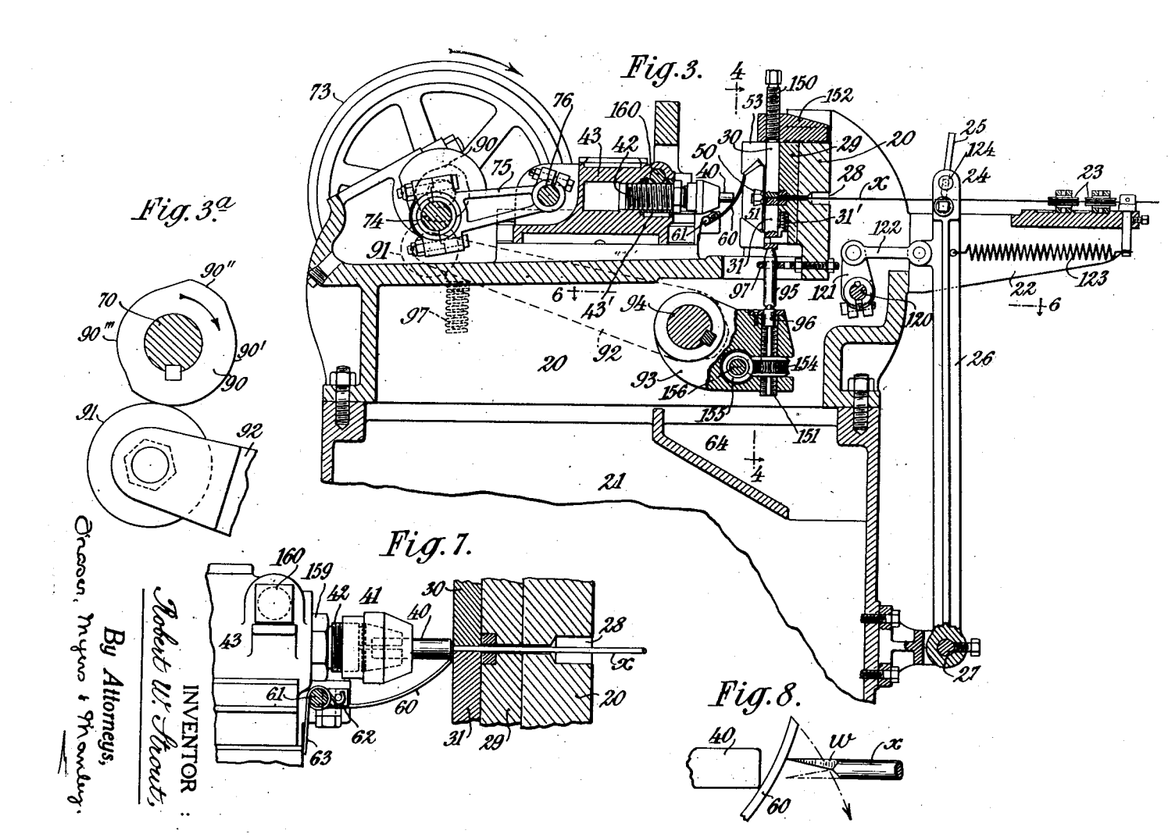

For knocking out the cut-off nail (unless it be so completely severed that it will fall of itself) a knock-off arm 60 is provided, preferably in curved form, as shown in Figs. 3 and 7, and mounted on a head 62 which is pivoted on a pin 61 and is pressed up by a spring 63.

As the hammer 40 moves forward it strikes the concave face of this arm, as shown in Fig. 3, and throws it down to the position shown in Fig. 7, so that if the previously cut nail is still adhering to the protruding end of the wire, it is knocked or broken off by this movement and thrown down into a chute or hopper 64 beneath.

The various moving parts are driven from a main shaft 70 having bearings supported on the main frame 20; this shaft may be driven by belt pulleys 72 (Fig. 2) and may have a fly-wheel 73. Between its bearings and in line with the middle of the machine it has a crank 74 engaged by a pitman or connecting rod 75 the opposite end of which engages a stud 76 fixed to the slide 43, whereby the latter is reciprocated.

The cutters 50, 50 are reciprocated simultaneously toward and from each other by motion which is most conveniently taken from the reciprocating slide 43. Pivoted to the top of this slide on opposite sides are the inner ends of toggle links 80, 80 (Fig. 2), the outer ends of which are jointed to rocking arms 81, 81, which are pivoted on vertical studs 82, 82, the lower ends of which are made fast in projecting ears 83 (Fig. 1) cast integrally with the main frame 20, while their upper ends are fastened in the opposite ends of a cross-link 84 which ties the studs together and receives the strains incident to the cutting operation. The opposite arms of the levers 81, 81 are connected to the slides 51, 51, which carry the cutting dies, in the manner best shown in Fig. 5. The ends 81 are rounded in preferably cylindrical form at 85, these rounded ends entering corresponding recesses in blocks 86 which are housed in openings in the slides 51 respectively, so that the arc movement of the pivotal centers of the cylindrical ends 85 causes the blocks 86 to slide laterally of the slides 51, thereby converting the arc movement into a parallel or straight line movement of the respective slides.

The movable gripping jaw 31 is operated by means driven from a cam 90 on the main shaft 70. This cam is best shown in Fig. 3ᵃ. It acts on a roller 91 carried by the long arm 92 of a lever which has a short arm 93 (Fig. 3), both arms being keyed to a rock shaft 94 (see Fig. 6). The short arm 93 connects by a toggle link 95 with the bottom end of the sliding jaw 31, as shown in Fig. 3. As the movement is very slight, the toggle link 95 is best made as a pin having at its upper end a ball and socket or rocking connection with the bottom end of the jaw, and having at its lower end a similar engagement with a part 96 on the arm 93. To prevent the pin falling out of position, a fixed ring 97 is provided which loosely embraces it. The long arm 92 is pressed up by a spring 97 to keep the roller 91 in engagement with the cam. As the roller 91 is pressed down by the cam, the short arm 93 acts to push up through the pin 95 and thereby raise the jaw 31 to grip the wire. Immediately after the feed of the wire the jaws close upon it and hold it tightly, while the cutting dies 50, 50 act to cut off the finished nail. During this time the roller 91 is acted upon by the concentric portion 90′ of the cam 90. Then the hammer or ram 40 approaches and the arm 60 knocks off the cut nail if it has not already dropped, and frees the end of the wire of any scrap. Just before the ram engages the protruding end of the wire, the latter requires to be gripped so tightly as to hold it firmly against the swaging action of the ram, and for this purpose the came is given a portion of greater projection 90″ (Fig. 3ᵃ), which causes the jaws 30, 31 to grip the wire with extreme pressure, so much so as to indent it and hold it positively against slipping during the strain of swaging the head. Immediately thereafter the portion 90‴ of the least projection engages the roller, so that the lever arm 92 is pressed up by the spring 97 and the lower jaw 31 is released and pressed down, thereby opening the grip and permitting the wire to be again fed.

Figure 1:
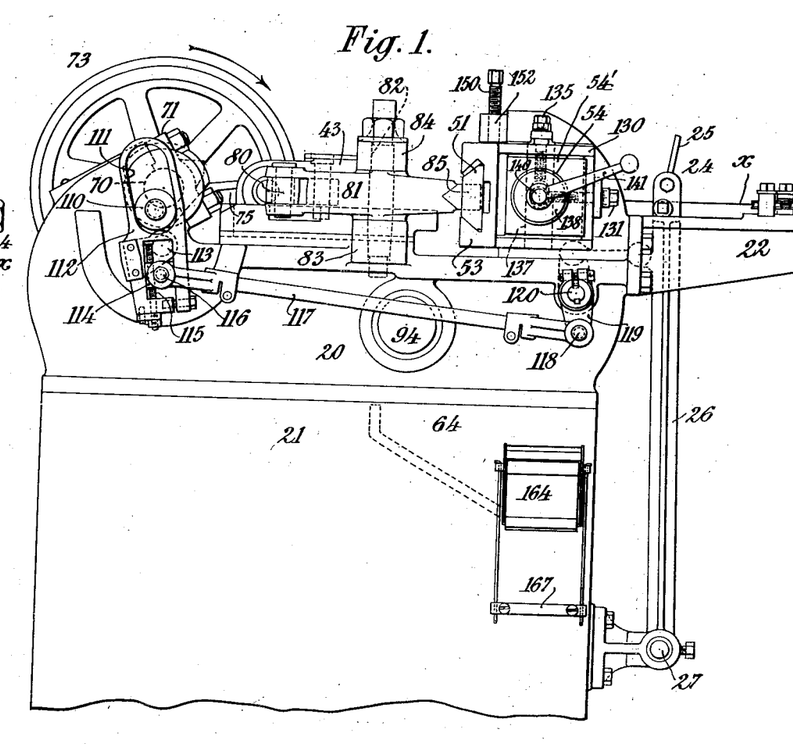
Figure 1 is a side elevation of the machine.
Figures 9, 10, 11:
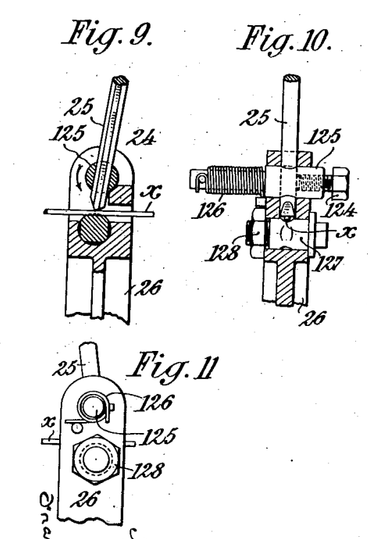
Figs. 9, 10 and 11 are fragmentary views showing the chisel feed for the wire, Fig. 9 being a vertical longitudinal mid-section, Fig. 10 a transverse section, and Fig. 11 a side elevation.

In the construction shown in Figs. 1 and 2, the wire feeder 24 is driven by a movement known as the Whitworth motion. A crank 110 on the main shaft 70 carries a roller which works in a slot 111 in a lever 112 which is pivoted at 113, and its opposite arm is provided with a sliding block 114 adjustable by means of a screw 115 and carrying a stud 116 on which is pivoted the end of a connecting rod 117, the opposite end of which is pivoted at 118 to a lever arm 119 fixed on a rock shaft 120 on which inside the frame is fixedly mounted an arm 121 (Fig. 3) which is connected by a link 122 with the lever 26 carrying the feeder. A spring 123 is preferably applied to this lever to assist in its idle return movement. The feeder 24 is of the type known as the "chisel feed", the pawl 25 somewhat resembling a chisel; it is fastened by a set-screw 124 in a stud 125 which is pivotally mounted in a socket in the upper end of the lever 26, and is provided with a spring 126 tending to turn it in the direction of the arrow in Fig. 9, so that its chisel end engages the wire x. The wire is carried over an abutment 127 which may be a hardened pin having suitable grooves and which is fastened by a nut 128 in a socket in the lever 26. It is shown as having four grooves, so that it may be turned to four different positions. If the machine is always to operate on wire of the same size, these four grooves may be alike, so that when one of them becomes too much worn, the stud may be turned to bring another one in position for use. If the machine is to operate on wires of different sizes, the grooves may be of different depths and radii corresponding to the differing sizes of wire. During the forward or feeding stroke the pawl 25 bites into the wire sufficiently to grip it with certainty, and thus feeds the wire forward, pulling it through the straightening rollers 23. During the back stroke the pawl 25 releases itself and slides freely back over the wire, which during that movement is held gripped by the dies 30, 31.

The feed motion described has a relatively quick feeding movement and relatively slow return movement, due to the crank pin and slot connection 110, 111. Both strokes have the characteristic of a crank motion in that the starting and stopping are gradual and without shock. With the proportions shown in Fig. 1 the feeding stroke is accomplished in about one-third (or less) of the revolution of the main shaft, and the return stroke in about two-thirds (or over) thereof (say, for example, about 120 and 240 degrees respectively); but obviously these proportions may be considerably varied according to any timing of the operations of the machine which is deemed preferable.

Certain details of construction and means for adjustment will now be described.

The primary adjustment is that to determine the length of the nail to be made. This is accomplished by varying the effective length of a lower arm of the lever 112 by adjusting up or down the block 114 carrying the stud 116. This adjustment is made by turning the adjusting screw 115. This varies the swing of the lever 26 and consequently increases or diminishes the scope of its feeding stroke.

The second important adjustment is that which determines the amount of metal which shall be swaged to form the nail head. This is governed by the extent of protrusion of the wire beyond the gripping dies 30, 31, after the wire has been fed and the nail has been cut off by the cutting dies or shears 50, 50. The amount of wire protruding is determined by the relative adjustment of the gripping dies 30, 31, and the cutting dies or shears 50, 50, as will be apparent from an inspection of Fig. 5. The extent of such protrusion could be determined by an adjustment of either pair of dies toward or from the other. For practical reasons it is preferable to make the dies 30, 31 unadjustable longitudinally of the wire, and to accomplish the adjustment by movement of the cutting dies 50, 50. To accomplish this the slides 51 carrying these dies are made of dovetail cross-section, as shown in Fig. 3, and slide in ways 52 of like cross-section formed in the transverse frames 53; and these frames 53 are mounted on the main frame 20 in such manner that they may be slid forward or backward (that is, in direction parallel with the feed of the wire) and be clamped in any adjusted position by the screw clamps 54. To this end the frames 53 are provided with projecting portions 130 extending backward (opposite to the direction of feed of the wire) along the opposite sides or cheeks of the frame 20, which latter is provided with suitable slideways receiving these extensions. The adjustment in the direction of the travel of the wire is accomplished by adjusting screws 131 (the heads of which are preferably provided with graduations to aid in the adjustment).

It is also necessary to be able to adjust the cutting dies 50, 50 up or down in order to bring them into precise coincidence with the axis of the wire. For this purpose the mountings for the frames 53 are made vertically adjustable by means of adjusting screws 135 which are mounted in the solid frame 20 and engage blocks 136, each of which engages a vertical slideway 137 formed on the respective cheeks of the frame 20; these blocks fit within square openings in the rearward extensions 130 of the frames 53, so that as they are moved up or down by their screws 135 they carry the frames 53 up or down with them.

When the two adjustments of either frame 53 thus described have been made, the frame is clamped tightly in place by means of the screw clamp 54. While this may be variously constructed, it includes a clamping plate 54' engaging the extension 130, and a follower 138 which receives the thrust of a nut 139 turning on a threaded stud 140 anchored in the frame 20, the nut having a handle 141 to facilitate turning it.

The dies 50 are fastened to their respective slides 51 by studs 145 drawn up by cap nuts 146. Their exact projection for adjusting their cutting action is determined by screws 147. The dies 50 are seated in longitudinal grooves in the slides 51 so as to admit of a slight longitudinal movement as the screws 147 are set up or back.

For adjusting the gripping jaws 30, 31, to bring their gripping faces into exact alignment with the wire, a screw 150 is provided for adjusting the upper jaw, and a screw 151 for the lower jaw. The former screw engages a fixed crosshead 152; the latter is threaded in the short lever arm 93 and is engaged by a nut 154 housed in a recess in this arm, the screw being splined in place so that it cannot turn, so that as the nut rotates, the screw is propelled up or down. The nut is turned by being formed as a worm wheel engaged by a worm 155 on a transverse shaft 156 having bearings in the arm 93 and arranged for easy access, so that it may be rotated to adjust the screw 151. For this purpose one end of the shaft 156 may be prolonged so as to be accessible through an opening in the main frame 20, as shown by dotted lines in Fig. 6, and its end 156' be squared or otherwise provided for engagement by a key or wrench for turning it.

Figures 4, 5:
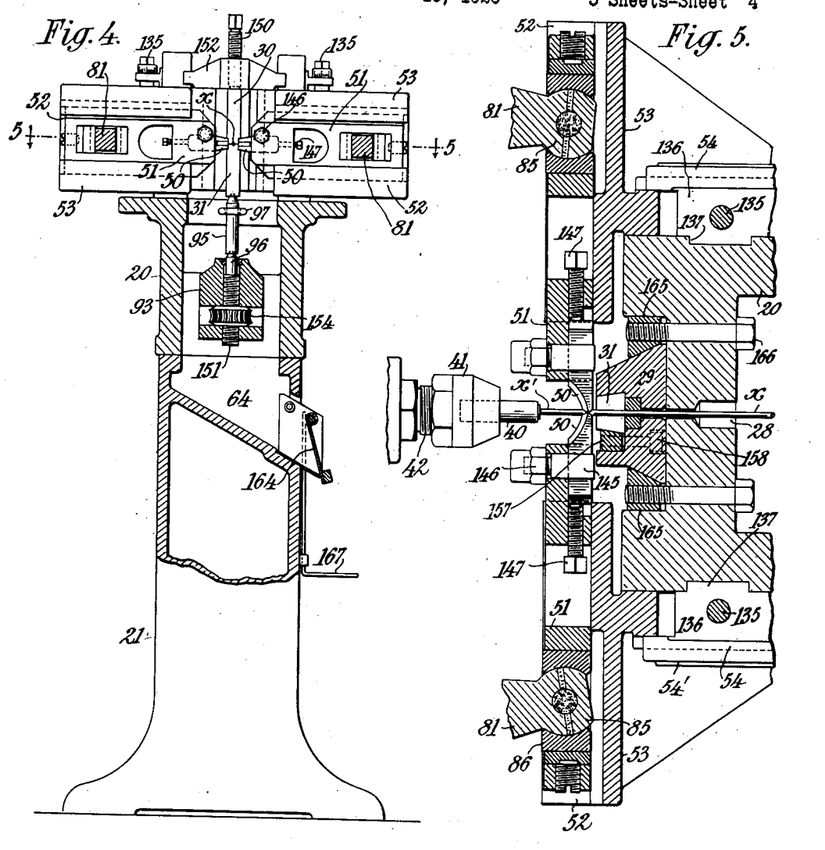
Fig. 4 is a vertical transverse section in the plane of the line 4—4 in Figs. 2 and 3.
Fig. 5 is a fragmentary horizontal section on a larger scale, on the line 5—5 in Fig. 4.

The jaws 30, 31 slide in a dovetailed groove in the slide 29, which groove is adjustable by means of a wedge 157 and adjusting screw 158 (Fig. 5). The carrying slide 29 is set in place by wedges 165 drawn up by screws 166.

The hammer or ram 40 is adjustable toward or from the jaws 30, 31 by adjusting the head 42 in the reciprocating slide 43. A convenient construction is that shown, wherein the head 42 is screw-threaded and engages internal threads in a bushing 43' in the slide 43, so that by turning it it may be screwed forward or back, being then locked by a set nut 159 and also preferably by a clamping screw 160 which draws together a split portion of bushing 43'.

The hopper 64 is shown as provided with a door 164 which may be opened to discharge the finished nails by pulling a wire frame 167.

It will be understood that the arms 81, where they engage the sliding blocks 86, are of reduced vertical dimensions, as shown in Fig. 4, so that adequate room is left between their rounded ends 85 and the blocks 86, or the socket in which the blocks move, to permit of the desired vertical adjustment of the frame 53, without necessitating that the arms 81 be also adjusted vertically.

It sometimes happens that the cutting jaws 50, 50 may not quite sever the metal from both the pointed end of the finished nail and the end of the wire which is left protruding; these dies should cut so deeply as to insure the pointing of the nail end and the separation of the scrap therefrom, so that the finished nail will drop free, even if the small particles of scrap (shown at w in Fig. 8) are not wholly severed from the end of the wire. The knock-out arm 60 is adapted to knock off any such adhering scrap w, in addition to knocking down the finished nail. This is accomplished by the sweeping stroke of the arm in the path shown in Fig. 8, into which path the scraps w project. This path extends to the rear of the cut formed when the nail is severed.

The machine as thus far described is admirably adapted for high speed operation. Its moving parts have the shortest practicable strokes and are given the least mass consistent with the requisite strength. The hammer 40 swages the nail head with a single blow. In every respect the timing of the machine is economized to the utmost. The result of the construction is that the output of the machine is practically doubled as compared with the best previous machines.

The construction thus far described is best adapted for the making of comparatively small nails requiring light wire. The straightening of the wire is done on the feeding stroke. For heavier wire it is preferable to straighten the wire on the return stroke of the feed. To accomplish this the straightening rollers 23 are mounted on a slide which reciprocates in the bracket 22 and is connected to the feed lever 26, so that during the feeding movement the rollers move forward with the wire, and during the return movement, while the wire is gripped in the jaws 30, 31, the rollers travel backwardly along the wire to straighten it.

Figures 12, 17, 18, 19:
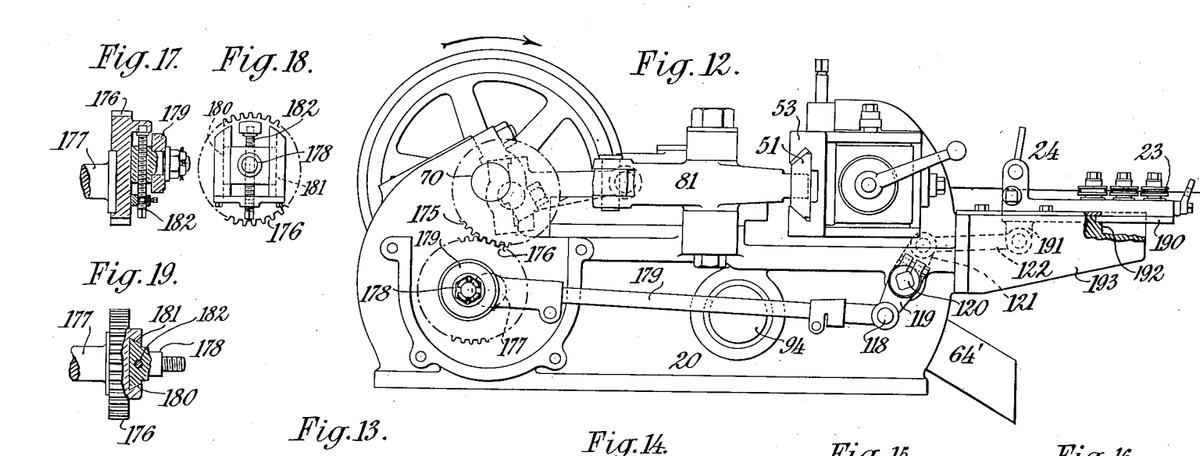
Fig. 12 is a partial side elevation corresponding to Fig. 1 and showing a preferred construction of wire feed.
Figs. 17, 18 and 19 are details, Fig. 17 showing the driven gear in vertical section in the position of Fig. 13, Fig. 18 being a face view, and Fig. 19 a plan partly in section.

This and another feature of further improvement relating to the feed are illustrated in Fig. 12.

In Fig. 12 all the parts are the same as in Fig. 1, except the feed motion and the discharge hopper for the nails; this hopper discharges through a spout 64' instead of laterally, as in Fig. 1. Instead of employing for the feed motion a crank and slotted lever, as in Fig. 1, the main shaft 70 carries an elliptical gear 175 which meshes with another elliptical gear 176. The latter or driven gear is mounted to turn around a fixed center which may be provided by a shaft 177 on which the gear is mounted, and which shaft turns in suitable bearings. The gear 176 carries a crank or crank stud 178 which is engaged by the eye of a connecting rod 179 (corresponding thus to the rod 117 of Fig. 1). The opposite end of this connecting rod engages the stud 118 of a lever arm 119 fixed on the rock shaft 120, which may be of the same construction as in Fig. 1. This rock shaft within the frame carries an arm 121, as in Fig. 3, which connects by a link 122 with the feed. The feed, instead of including a swinging lever arm 26, as in Figs. 1 and 3, comprises a slide 190 having beneath it an ear 191 to which the link 122 is jointed, and whereby the slide is reciprocated. The slide carries the feeder 24, which is of the same construction as shown in Figs. 1 and 9–11. The slide also carries the straightening rollers 23. The slide 190 moves in a suitable slideway 192 formed in the bracket 193, which is otherwise similar to the bracket 22 of Fig. 1.

Figure 13:
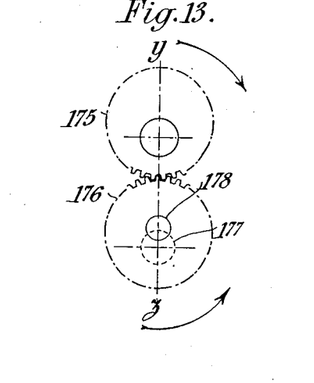
Figs. 13, 14, 15 and 16 are diagrammatic views showing four different positions of the feed movement.
Figures 14, 15:
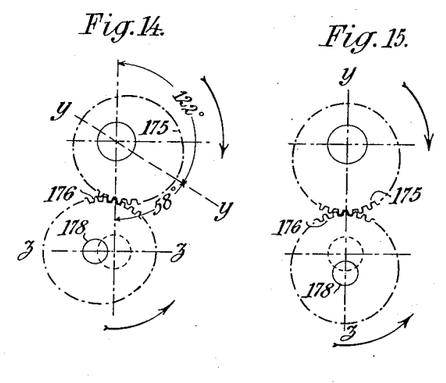
Figure 16:
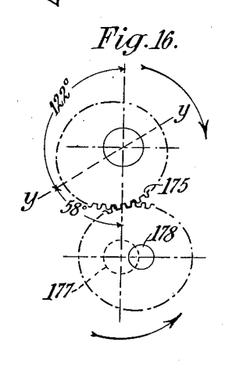

The operation of the elliptical gears will be made clear from Figs. 13–16. Fig. 14 shows the same position as Fig. 12, where the crank 178 is on its dead center, this being the beginning of the feed stroke. Fig. 15 shows the feed at mid-stroke; the major axis $y, y$ (Fig. 14) of the driving gear 175 has moved 58 degrees, whereby it is brought into coincidence with the major axis $z, z$ (Fig. 14) of the driven gear 176, as shown by the vertical line $y, z$. Fig. 16 shows the position at the end of the feeding stroke, where the major axis $y, y$ has moved another 58°. The movements shown in Figs. 15 and 16 have each imparted to the driven gear a turn of 90°; so that for the entire feed stroke the driven gear with its crank moves 180°, while the driving gear has moved only 116°. The return stroke of the feed is accomplished in the remaining 244° of the turn of the driving gear. Fig. 13 shows the gears at mid return stroke, their respective major axes being in alignment on the line $y, z$.

Thus, by the use of elliptical gearing the feed movement is performed in somewhat less than one third of the total period represented by one revolution of the driving shaft, and the return stroke in something over two-thirds; and both strokes are given with a gradual acceleration and gradual retardation which is ideally conducive to high speed operation, besides affording a very simple feed drive.

The adjustment of the feed stroke may be accomplished in various ways, the preferable means being to vary the throw of the crank stud 178. My means of accomplishing this is shown in Figs. 17–19, where this crank stud is mounted on a slide 180 which is confined in a slideway 181 formed on or carried by the driven gear 176, and a screw 182 is provided, by turning which the slide 180 may be moved in the direction of the major axis $z, z$ to vary the throw of the crank. For clearness the construction shown in Figs. 17–19 is not shown in Fig. 12.

Whether the wire feed motion is as shown in Fig. 1, or of the elliptical gear construction shown in Fig. 12, it is characteristic of its operation that it accomplishes the feeding of the wire in materially less than a half turn of the driving shaft and preferably in less than one-third of the turn; and it imparts both strokes by a gradual acceleration and retardation, so that their strokes if plotted would show smooth curves giving movements of the harmonic or pendulus order. Both features contribute to high speed operation, the former by so restricting the feed movement as to afford ample time for the other operations, and the latter by affording smooth and easy motions to the feeding parts, so as to avoid shocks and vibration. The desirability of diminishing the time for the feeding stroke to below a half turn or 180 degrees, is that the other movements, namely, the closing together of the gripping dies, the cutting off of the previously headed nail, the advance of the hammer to form a new head, the retreat of the hammer to carry it out of the way, and the release of the gripping dies, require, for a proportional distribution of the times allotted to the several movements, considerably more than half the total period of 360° travel, and this additional time is provided for by the means set forth in the way that enables the heading slide to be operated by a simple crank movement and the feed motion to be taken as directly as possible from the main shaft. This feed motion lends itself readily to a machine of the type set forth, in which a reciprocating slide 43 is crank-driven from the main shaft and performs the heading at one end of its stroke, and the cutting of the wire at its opposite end, these operations thus being 180° apart; between the heading and cutting the gripper jaws 30, 31 have to release the wire, the wire has to be fed forward, and these jaws then have to close to grasp the wire to hold it during the cutting-off operation; during the next advance stroke of the slide the cut off nail any any scrap are knocked down and the dies are brought tighter together by the salient portion 90″ of the cam 90, and the feed is executing its return movement while the wire is held by these gripping dies.

The advantage of varying the grip upon the wire by the dies 30, 31, so that it is tightly gripped only at the instant of heading, and is firmly but not forcibly gripped at other times, is that the wear on the cam 90 and roller 91, and the bearings for this roller, is minimized to the utmost. This eliminates much trouble that has heretofore been had in nail machines.

The described adjustments enable the nail to be given a head of any desired thickness and diameter. The feeding stroke is adjusted to equal the length of the nail plus the protruding portion left between the last cut and the gripping jaws, which constitutes the metal from which the head is to be swaged; the extent of this protruding portion is determined by the adjustment of the cutting dies 50 toward or from the gripping dies 30, 31; the thickness of the head is determined by the approach of the swaging hammer 40 to the dies 30, 31; to increase the diameter of the head without changing its thickness, this last adjustment is unaltered and the cutters are carried further from the gripping dies to leave more stock protruding, the feeding stroke being correspondingly lengthened.

While the constructions shown and described constitute the preferred embodiment of the invention, it will be understood that it may be otherwise embodied within the scope of the appended claims.

What I claim is:—

1. In a nail machine, wire-gripping means, a swaging hammer and wire-cutting means, with nail head-adjusting means comprising a normally stationary frame carrying the cutting means, said frame mounted adjustably on the main frame of the machine, and movable longitudinally of the wire to adjust the cutting means, and means for fastening said adjustable frame fixedly to the main frame after its adjustment.

2. In a nail machine according to claim 1, said frame carrying the cutting means having a longitudinal slideway connection with the main frame of the machine, whereby to displace the cutters in line with the wire.

3. In a nail machine according to claim 1, the cutting means comprising cutting dies and slides carrying them, and means for adjusting the nail-head comprising frames in which said slides move, said frames mounted on the main frame of the machine and adjustable transversely to the line of feed of the wire, whereby to bring the cutting dies into axial alignment with the wire.

4. In a nail machine according to claim 1, the means for fastening said frame after adjustment comprising clamping means.

5. In a nail machine having wire cutting dies, slides carrying them, and frames having slideways for said slides, the combination therewith of means operating said slides comprising vibrating levers, having circular ends within the planes of the slides, the slides having recesses with walls perpendicular to the transverse planes of movement of the slides, and rectangular blocks movable in said recesses transversely to the slides, said blocks having concave recesses receiving the ends of the levers, whereby to communicate transverse movements from the lever ends to the slides.

6. In a nail machine according to claim 5, the frames carrying said slides mounted to be adjusted vertically, and the openings in said slides for said blocks receiving the rounded ends of said levers of greater vertical dimension than said rounded ends, whereby to permit of such vertical adjustment.

7. In a nail machine comprising a driving shaft with wire feed, cutters and heading hammer driven therefrom, proportioned to form a nail to each turn of said shaft, the heading hammer carried on a slide reciprocated from a crank on said shaft, a wire feed motion adapted to impart a feeding movement to the wire in less than a half revolution of the shaft, and to give gradual acceleration and retardation to both feeding and return movements.

8. In a nail machine comprising a driving shaft, a reciprocating slide driven therefrom by a crank motion, a heading hammer operating at one end of the stroke of said slide, cutters arranged to sever the wire at the opposite end of said stroke, gripping dies and a wire feed driven from said shaft, the wire feed motion adapted to feed the wire during the return stroke of said slide, and the gripping dies adapted to release the wire between the end of the heading and the beginning of the feed movement, and to re-grip the wire between the end of the feed movement and the cutting stroke, the wire feed adapted to start the wire with a gradually accelerating motion.

9. In a nail machine according to claim 8, the feed motion adapted to impart a gradual acceleration and retardation to the feeding and return movements.

10. In a nail machine comprising a driving shaft, with wire feed, cutters and heading hammer driven therefrom, the wire feed comprising a wire feeder, a crank and connecting rod for reciprocating it, and means for imparting to the feeder a quick feed stroke and slow return stroke.

11. In a nail machine comprising a driving shaft and reciprocating wire feed, means for operating said feed comprising elliptical gears driven from said shaft, and through which the feed is reciprocated, whereby to impart to the feed a quick feeding stroke and slow return stroke, each having a gradual acceleration and retardation.

12. In a nail machine, a wire feed according to claim 11, the elliptical gears mounted respectively on the driving shaft and on a fixed axis, the driven gear having a crank, and a connection between said crank and the wire feed.

13. In a nail machine, a wire feed according to claim 11, the elliptical gears mounted respectively on the driving shaft and on a fixed axis, the driven gear having a crank, and a connection between said crank and the wire feed, with adjusting means to vary the throw of the feed.

14. In a nail machine, a wire feed according to claim 11, the elliptical gears mounted respectively on the driving shaft and on a fixed axis, the driven gear having a crank, and a connection between said crank and the wire feed, said crank on the driven gear adjustable toward and from the axial center around which said gear revolves, whereby to vary the throw imparted to the feed.

15. In a nail machine, a wire feed according to claim 11, the elliptical gears mounted respectively on the driving shaft and on a fixed axis, the driven gear having a crank, and a connection between said crank and the wire feed, said crank mounted on a slide, and said driven gear having slideways for said slide, and an adjusting screw for locating said slide on said gear, whereby to vary the throw imparted to the feed.

16. In a nail machine comprising wire feeding, gripping, and cutting means, and a hammer for swaging the protruding wire to form the nail head, the combination therewith of a transversely-movable knocker and means for moving it across the line of the wire after the separation of the cutting dies and during the advance of the hammer to swage the next head, said knocker adapted to sweep through the line of the cut, whereby to break off from the protruding end of the wire any spurs which may be left adhering to the wire.

17. In a nail machine comprising wire feeding, gripping, and cutting means, and a hammer for swaging the protruding wire to form the nail head, the combination therewith of a knocker movable across the face of the hammer, having spring means for retracting it, and located obliquely relatively to the hammer, so that the forward movement of the latter actuates the knocker to knock off the previously-cut nail.

18. In a nail machine according to claim 1, the frame carrying the cutting means adjustable on the main frame of the machine, both longitudinally of the wire and vertically, and clamping means for fastening said frame to the main frame after adjustment.

19. In a nail machine having wire-gripping means, a swaging hammer and wire-cutting means, the latter comprising slides carrying cutting dies, adjustable frames having transverse slideways for said slides, and having longitudinal portions in vertical planes against opposite sides of the main frame, and adjustable in such vertical planes, and clamping means for fastening the longitudinal portions of said adjustable frames to the main frame in different adjusted positions.

In witness whereof, I have hereunto signed my name.

ROBERT W. STROUT.